May 4, 1965  E. G. OLSON  3,181,715
SILO UNLOADER CONNECTION
Original Filed May 21, 1959  4 Sheets-Sheet 2

INVENTOR
EARL G. OLSON
BY Moore, White & Burd
ATTORNEYS

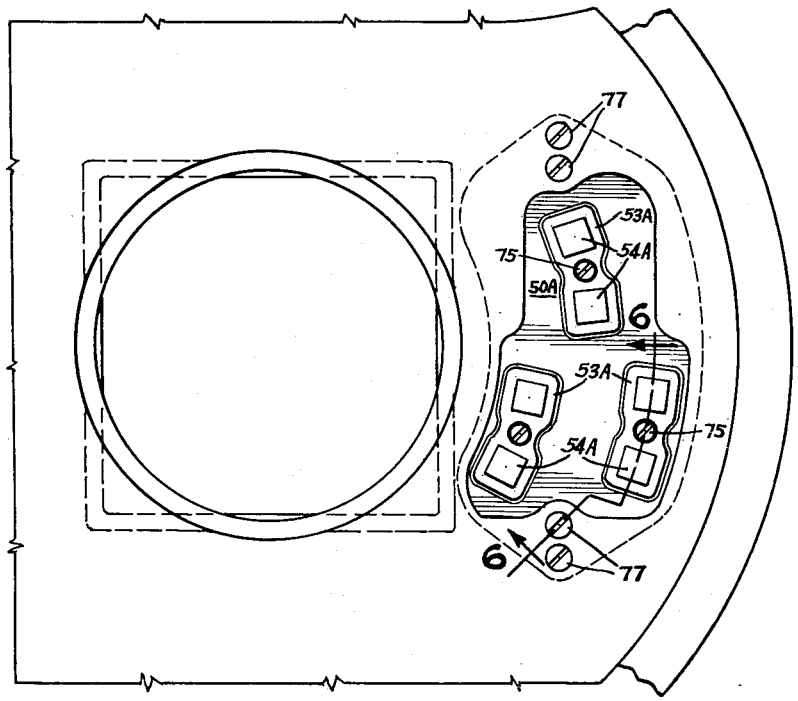
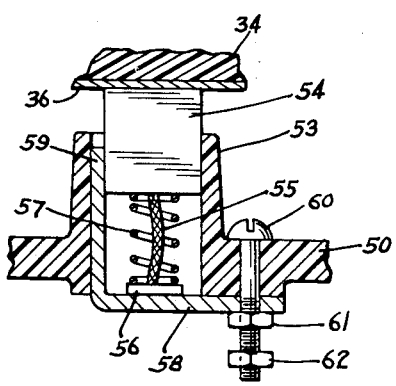
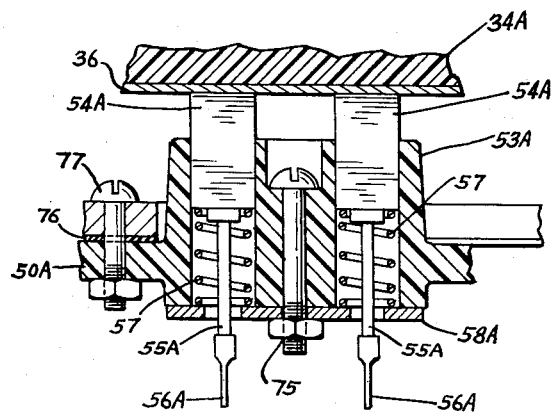

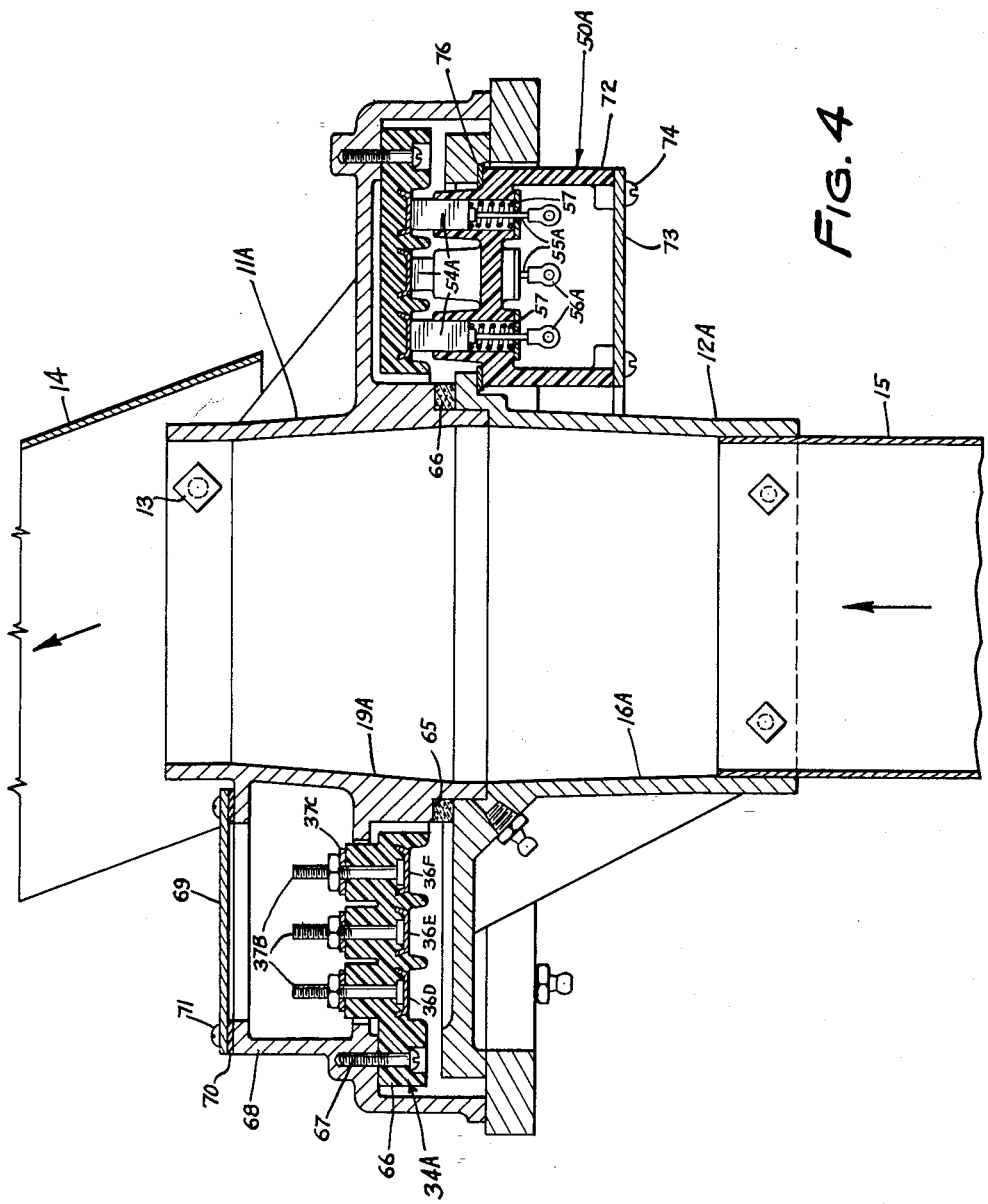

United States Patent Office 3,181,715
Patented May 4, 1965

3,181,715
SILO UNLOADER CONNECTION
Earl G. Olson, Minneapolis, Minn., assignor to Vandale Corporation, Long Lake, Minn., a corporation of Minnesota
Continuation of application Ser. No. 814,915, May 21, 1959. This application Mar. 14, 1963, Ser. No. 266,140
9 Claims. (Cl. 214—17)

This application is a continuation of application Serial No. 814,915, filed May 21, 1959, now abandoned.

This invention relates to new and useful improvements in connections for silo unloaders or the like.

As disclosed in Patents 2,671,696 and 2,794,560, at least one type of silo unloader comprises a stationary portion including means for delivering ensilage from a silo and a portion rotatable about its inner end on a vertical axis for collecting surface ensilage and delivering it to said stationary portion. Electricity is usually delivered by appropriate source of current to the stationary portion and from thence through an electric ring contact assembly or transition assembly to the rotatable portion or assembly. At the same time, ensilage is delivered from said rotatable portion of said stationary portion through the electric ring contact assembly or transition assembly. It is to such a new and improved structure that this invention is directed.

While various attempts have been made to provide suitable contact ring assemlbies or transition assemblies, for transferring current, yet permitting ensilage flow without difficulty, such assemblies have suffffered from defects of one sort or another. Specifically, it has been found exceedingly difficult to provide a fool-proof assembly whereby the rotatable portion is securely connected to the stationary portion for ready rotation of the one with respect to the other, yet which precludes escape of the material being conveyed from its intended course into the ring assembly. It has further been found a problem to provide a structure which may be readily assembled and readily disassembled for cleaning, inspection and the like. A further defect of the prior art assemblies has been the failure of the assembly to resist condensation, entrance of foreign matter, etc.

It is therefore an object of this invention to provide an electric ring contact assembly for a silo unloader or the like which has markedly increased stability and resistance to failure from condensation, entrance of extraneous matter, etc.

It is a further object of this invention to provide such an assembly which is extremely sturdy, but readily assembled and disassembled.

Still a further object of this invention is to provide an assembly with readily removable contact rings and contact brushes which may be removed for cleaning, etc.

Still a further object of this invention is the provision of new and useful transition assembly for silo unloaders or the like in which a positive, rotatable connection is provided between stationary and rotatable members.

Still further objects of this invention reside in the specific structural details and features of the stationary electrical contact ring subassembly, the rotary electrical contact ring subassembly and the cooperation between them.

Still further objects of this invention reside in specific structural details of the assembly.

Other and further objects of this invention are those inherent and apparent in the apparatus as described, pictured and claimed and will become evident as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which corresponding numerals refer to the same parts and in which:

FIGURE 3 is an enlarged sectional view through one of the brush retainers of FIGURE 1, taken along the line and in the direction of the arrows 3—3 of FIGURE 2;

FIGURE 4 is a view similar to FIGURE 2 but showing a modified form of the invention;

FIGURE 5 is a fragmentary top plan view of the rotary subassembly of FIGURE 4; and FIGURE 6 is a view taken along the line and in the direction of the arrows 6—6 of FIGURE 5.

Throughout the drawings the electric contact ring assembly is shown in use in an unloader such as in Patent 2,794,560 and reference is made thereto for the details thereof. Since the unloader forms no part of the invention per se, it is not further illustrated or described.

Figure 1:
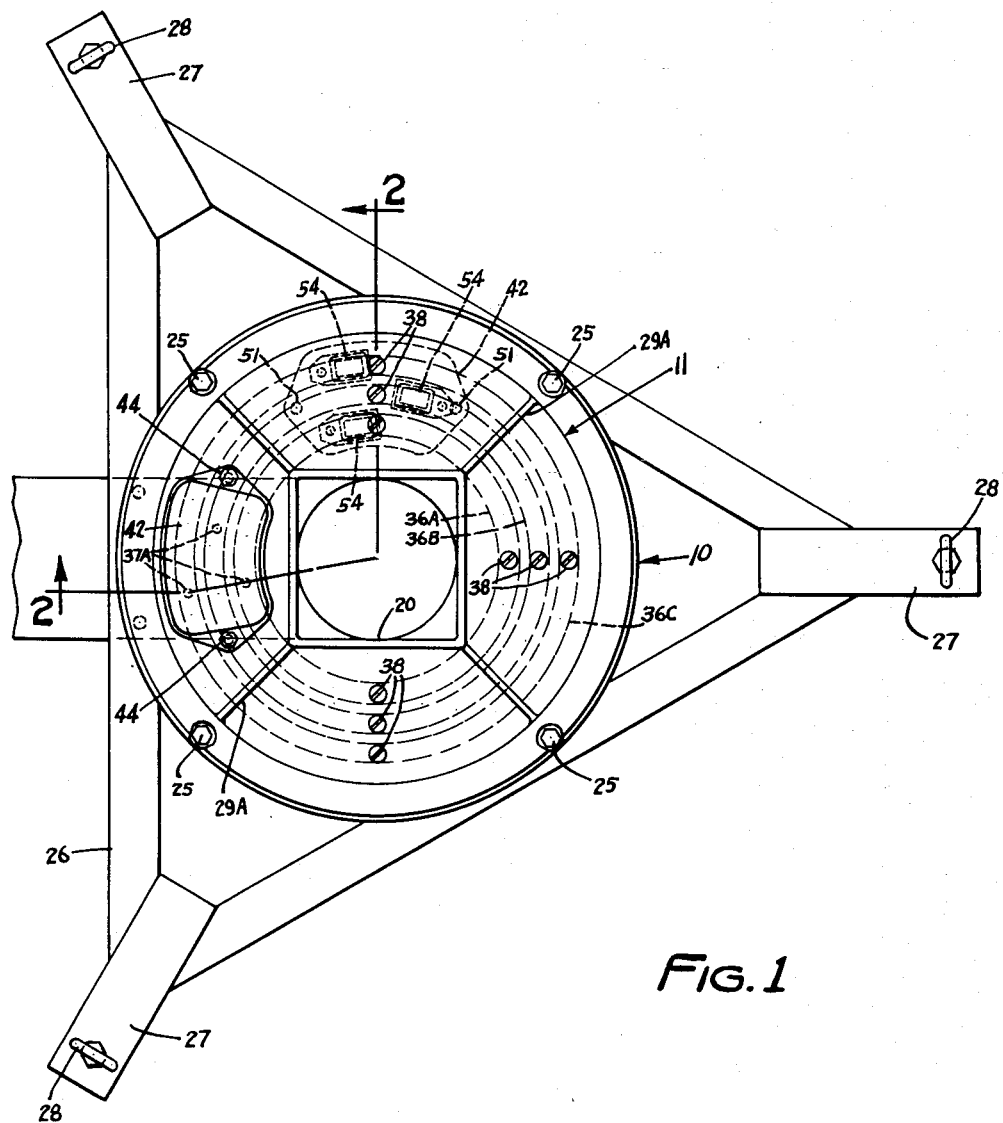
FIGURE 1 is a top plan view of the instant invention.

Thus, as shown in FIGURE 1, the transition assembly or electric contact ring assembly generally designated 10 comprises an upper or non-rotating subassembly generally designated 11, and a lower or rotating assembly generally designated 12. Assembly 11 is pivotally connected by a pair of opposed bolt assemblies 13 to a channel discharge chute 14 which may be as shown in Patent 2,794,560 or which may extend outwardly to the wall of the silo. As shown, it comprises a U-shaped chute pivoted at its side walls by pivots 13. Subassembly 12 is secured to the rectangular discharge end 15 of a central impeller such as impeller 42 of Patent 2,794,560. This square chute has an outside diameter slightly smaller than the inside diameter of rectangular lower throat 16 so that it may be secured thereto by four opposed bolt assemblies 17, two of which are shown.

Throat 16 is restricted upwardly to its annular shoulder 18 which serves as an annular seat for rotation of end 19 of the upper throat 20 therein. Upper throat 20 has a cylindrical bore and lower throat 16 has a bore square at end 19 but transiting to cylindrical at shoulder 18.

Assembly 12 includes an annular plate portion 20A of the configuration shown, having a downwardly turned peripheral edge portion 21 provided with a machined face 22 as shown in FIGURE 1. Machined face 22 engages the cooperating but oppositely disposed machined face 23 of a ring 24 which is bolted to assembly 11 by a plurality of bolt assemblies 25.

Bolted to the bottom of ring 24 is a supporting triangle 26 which is comprised of a plurality of angle members welded together and provided with extending apex pieces 27 to which are secured eye-bolts 28. Eye-bolts 28 are used to secure cables which support the transition assembly 10 and the silo unloader thereby, as shown in Patent 2,794,560.

Gussets 29 are provided extending between the bottom of plate 20A and exterior of throat 16 as desired for strength. Similar gussets 29A are provided between the top or outer surface of member 31 and throat 20.

A grease fitting 30 leads to the juncture of shoulder 18 and end 19 for lubrication thereof. A similar fitting 30A serves to lubricate machined faces 22 and 23.

Assembly 11 is provided with a downwardly dished member or cover 31 providing an interior space 32. To the under surface 33 of member 31 is secured an annular channel member 34 having a plurality of downwardly turned channels 35 for the reception of electric rings 36A–C. Rings 36A–C are annular flat members of conductive copper or the like and have secured thereto a plurality of threaded studs 37, each penetrating cooperating apertures in channel member 34, the apertures in channel member 34 being substantially larger than the outside diameter of studs 37 to accommodate the outside diameter of an internally threaded insulating screw 38 of suitable synthetic resinous material or the like. The internal threaded bore of this screw receives stud 37. Screws 38 are of the configuration best shown in FIGURE 2 and in addition to penetrating the apertures in channel 34 penetrate cooperating apertures in cover 31. The inside diameters of the apertures in channel 34 and cover 31 are sufficient merely to accommodate the outside diameter of the shanks of screws 38.

Figure 2:
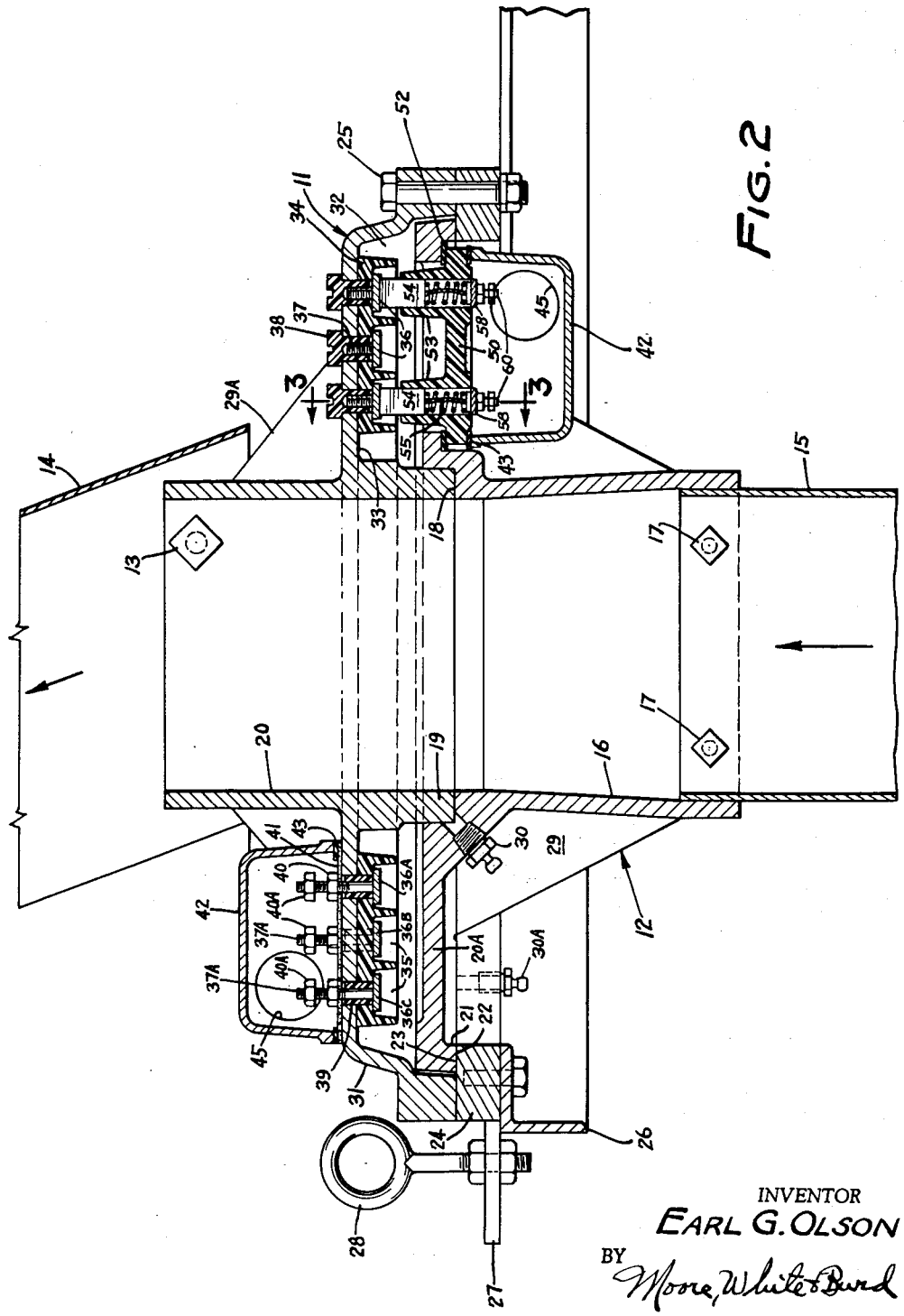
FIGURE 2 is a sectional view taken along the line and in the direction of the arrows 2—2 of FIGURE 1.

Each of rings 36A–C is provided with a threaded terminal stud 37A, similar to studs 37, but elongated and provided with a cylindrical shank portion. The cylindrical shank portion penetrates cooperating apertures in channel member 34 and cover member 31 similar to the penetration of studs 37, and the threaded end extends considerably above portion 31 as shown in FIGURE 2. Synthetic resinous bushings 39 take the place of the screws 38, in this instance.

A substantially rectangular insulating gasket 41, properly apertured to receive studs 37A, is positioned on the top or upper surface of member 31 and secured thereto by retaining nuts 40 on studs 37A. If desired, in addition, the gasket 41 may be cemented to the top surface.

A cap 42 of downwardly turned cup-shaped configuration is provided with a fiber or synthetic resinous terminal or edge gasket 43, which as shown in FIGURE 2, is superimposed on gasket 41 to provide a tight closure or cover for the ends of studs 37A, which serve as terminals.

The cover is retained in position by screws 44 suitably threaded in portion 33. The cover 42 is provided with a hole 45 which permits emergence of any cable or cables secured to the terminals 37A by contact nuts 40A. Studs 37A serve as terminals to which wires are secured between nuts 40 and 40A after which nuts 40A are tightened. Such cables will be appropriately secured and sealed to the wall of cover 42 at the hole to prevent entrance of foreign matter.

A brush retainer housing 40 of the form shown in FIGURE 2 is secured by bolts 51 to assembly 12 and extends through an aperture provided therein for that purpose. It is seated against a peripheral rubber gasket 52 and provided with a plurality of upwardly extending integral sleeves 53 each having a rectangular inner well in which a brush 54 is seated. This is perhaps best shown in FIGURE 3. The brush 54 is provided with a flexible tail 55 terminating in a flat end 56 around which tail is positioned a spring 57. The brush is retained in position by an L-shaped brush retainer 58 having an end 59 extending upwardly into the sleeve 53. The other end is positioned horizontally under housing 50 and apertured to receive bolts 60 having a retaining nut 61 and a contact nut 62 thereon. Bolt 60 serves as a terminal to which a wire is secured between nuts 61 and 62 after which nut 62 is tightened. A gasket 43 identical to the gasket 43 for previously described cover 42 is provided as is a second cover 42 similarly secured to assembly 11. The covers 42 are identical, one being downwardly turned on assembly 11 and the other being upwardly turned on assembly 12.

In use, electricity is conveyed from any suitable source of electric current by a power line or cable into cover 42 on assembly 11 and by leads to terminals 37A, the power line being sealed at hole 45 against entrance of foreign material by any suitable means. Current is then transferred to the three rings 36A–C and from them to cooperating brushes 54 which are maintained in communication with the rings by springs 57. Current is transferred via the terminals 60 to a cable and from cover 42 on assembly 12 to electric motor, situated on the rotating part of the silo unloader for driving the unloader. This cable is also sealed to cover 42 by resilient washers, grommets, caulking, etc. As the bottom portion of the silo unloader rotates, the lower assembly 12 will rotate in upper assembly 11 at the juncture of end 19 with the shoulder 18 and at the machined faces 22 and 23. Ensilage will be conveyed upwardly through the throats 16 and 20 and outwardly through the chute 14 as shown by the arrow in FIGURE 2.

The interior of assemblies is sealed from external dirt, etc. by the cooperation of throats 16 and 19 and of machined surfaces 22 and 23.

A modified form of this invention is shown in FIGURES 4–6. In this modified form the throat 16A tapers outwardly instead of inwardly and throat 19A tapers inwardly instead of having cylindrical or parallel walls. Assembly 11A is provided with a shoulder 65 spaced from plate 20A and at which is provided a resilient gasket 66.

The channel member 34A, again of synthetic resinous material, is provided with a plurality of spaced ears 64 by which it is secured to the assembly 11A by screws 67. The rings 36D–F are provided with turned edges as shown in FIGURE 4 which are embedded in the synthetic resinous material of channel member 34A. The rings are retained by such embedding. Threaded studs 37B, each provided with washers 37C serve as terminals to which rings 36D–F are connected, either by soldering or by nuts as previously explained with reference to the modification of FIGURES 1–3.

In this instance there is substituted, in lieu of cover member 42, an integral box 68 having an open top adapted to be covered by a flat cover plate 69 drawn down against an edge gasket 70 by screws 71. Plate 69 is apertured for receipt of the power cable.

In the modification of FIGURES 4–6 retainer housing 50A similar to retainer housing 50 has a depending wall 72 closed by an apertured cover plate 73 secured thereto by screws 74. The brushes 54A are similar to brushes 54 but provided with an end eye 56A instead of end 56. In this instance, the tail 55A is of somewhat stiffer material than tail 55 of the modification of FIGURES 1–3.

Brushes 54A are used in pairs as shown in FIGURE 5 where they are positioned in pairs of cooperating sleeves 53A. Cooperating pairs of brushes are retained by brush retainer 58A, having apertures permitting emergence of end eyes 56A and secured to close the ends of a cooperating pair of sleeves 53A by bolt assembly 75. The retainer housing 50A is bolted to assembly 12 (with an interposed gasket 76) by a plurality of bolts 77.

In use, the modification of FIGURES 4–6 operates exactly as the modification of FIGURES 1–3, electricity being conveyed from any suitable source of electric current by a power line or cable through flat cover 69 and by leads to terminals 37B, the power line being sealed at its entrance through cover 69. Current is then transferred to the rings 36D–E and from thence to cooperating brushes 54B which are maintained in communication with the rings by springs 57. Current is then transferred via the terminal end eyes 56A to leads soldered or otherwise secured thereto and to a cable and from cover 73 to an electric motor which is situated on the rotating side of the silo unloader and which rotates the unloader. This cable is also sealed to cover 73 as stated.

As before, with reference to the modification of FIGURES 1–3, as the bottom portion of the silo unloader rotates, the lower assembly 12A will rotate with reference to the upper assembly 11A at the juncture of throats 16A and 19A and the cooperating machined surfaces. Ensilage will be conveyed upwardly through the throats 16A and 19A and outwardly through the chute 14.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A silo unloader transition assembly comprising a first conduit means, said first conduit means having a central conduit surrounded by an annular top housing, said annular top housing providing annular substantially planar internal space, an electrical contact ring supporting assembly secured thereto and therein, said electrical contact ring supporting assembly including a synthetic resinous means providing a plurality of downwardly directed concentric channels positioned in substantially a horizontal plane, a plurality of current conducting rings, one disposed in each of said concentric channels and providing annular electric power transmitting rings each having a downwardly exposed surface, means for providing a source of electric current to a plurality of said current conducting rings, a second conduit means, first cooperating surfaces joining said first and second conduit means to provide a continuous conduit, a peripheral retaining ring means secured to said top housing and therebeneath and providing an annular upwardly directed machined surface, said second conduit means providing an annular bottom housing, said last housing having a downwardly directed machined surface adapted to be positioned on said upwardly directed machined surface and an annular periphery adapted to be positioned within said peripheral retaining ring means of said top housing, means joined to said first conduit means permitting cable support of said first and second conduit means, said second conduit means being provided with a brush retaining means, and a plurality of electric power transmitting brushes each having an upwardly exposed surface for engaging the downwardly exposed surface of its respective ring means.

2. The structure of claim 1 further characterized in that said second conduit means is provided with an annular recess in which an annular portion of said first conduit means is adapted to be seated.

3. A silo unloader transition assembly comprising a first conduit means having means forming a first conduit portion and a first annular housing portion integral with and surrounding said first conduit portion, a second conduit means having means forming a second conduit portion and a second annular housing portion integral with and surrounding said second conduit portion, said second conduit means cooperating with said first conduit means to form a rotatable connection between said conduit portions and integral annular housing portions, said integral annular housing portions having cooperating, slidably engaging surfaces, whereby the space they surround is substantially sealed against the surrounding atmosphere when said first and second conduit and housing portions are engaged with each other, a first sliding electrical contact means secured within said first housing portion, a second sliding electrical contact means secured within and to said second housing portion and means for securing electrical conductors to all of said sliding electrical contact means while retaining the sealed character of said first and second integral housing portions and supporting cable attaching means secured to said conduit means and extending beyond the outside diameter thereof; said support means supporting said first and second conduit means in a manner urging said slidably engaging surfaces of said first and second conduit means housing portions into intimate contact with each other.

4. A silo unloader transition assembly comprsing a first conduit means having means forming a first conduit portion and a first annular housing portion integrally formed therewith and surrounding said first conduit portion, a second conduit means having means forming a second conduit portion and a second annular housing portion integrally formed therewith cooperating with said first conduit means to form a rotatable connection between said conduit portions and integral housing means, said integral housing means being substantially sealed against the surrounding atmosphere when said first and second conduit and housing means are engaged with each other, a first sliding electrical contact means secured within said first housing portion, a second sliding electrical contact means secured within and to said second housing portion and means for securing electrical conductors to all of said sliding electrical contact means while retaining the sealed character of said first and second integral housing portions, said integral housing portions extend radially with respect to said conduit members substantially farther than they extend axially with respect thereto, and a silo unloader supporting anchor structure secured to the underside of the upper of said first and second conduit means and engaging rotatably the underside of the lower of said first and second conduit means.

5. The structure of claim 3 in which said first sliding electrical contact means consist of radially spaced concentric slip rings, and said second sliding electrical contact means consist of brushes engaging said slip rings.

6. An electrical transition device for a silo unloader or the like having a stationary portion, a rotatable portion, and means for transmitting electrical energy from the stationary portion to the rotatable portion comprising, at least two conducting rings secured to one of said stationary and rotating portions and spaced concentrically from each other with respect to the axis of rotation of said rotatable portion, electrical conducting brushes at least equal in number to said electrical conducting rings, said electrical conducting brushes being secured to the other of said stationary and rotating portions in alignment with said electrical conducting rings and in sliding electrical contact therewith, said rings and brushes being encased in a sealed housing, said rings being embedded in an annular ring of insulating material, whereby parallel annular portions of said annular ring of insulating material extend beyond the brush contacted surface of said rings between and at the edges thereof.

7. The structure of claim 6 further characterized by said means for keeping said sealed housing sealed while remaining rotatable, one portion with respect to the other, comprising, machined surfaces on said stationary and rotatable portions of said sealed housing engaging each other, means for applying lubricating and sealing material to said engaged machined surfaces; whereby said stationary and rotatable parts may freely move with respect to each other while retaining the sealed character of the sealed housing encasing said electrical conducting rings and brushes.

8. A silo unloader transition assembly comprising a first conduit means, said first conduit means having a first central conduit surrounded by a first annular housing portion, an electrical contact ring supporting assembly secured thereto, said electrical contact ring supporting assembly including a synthetic resinous means providing a plurality of downwardly directed concentric channels positioned in substantially a horizontal plane, a plurality of current conducting rings, one disposed in each of said concentric channels and providing annular electric power transmitting rings each having a downwardly exposed surface, means for providing a source of electric current to a plurality of said current conducting rings, a second conduit means, said second conduit means having a second central conduit surrounded by a second annular housing, said second annular housing being complementary to said first annular housing, first cooperating surfaces joining said first and second conduit means to provide a continuous conduit, a peripheral retaining ring means secured to one of said first and second annular housings and providing an annular machined surface, the other of said first and second annular housings having a machined surface engaging, slidingly and sealingly said machined surface of said peripheral retaining ring, means joined to one of said first and second conduit means permitting support of said first and second conduit means as to urge the annular machine surface of the other of said first and second annular housings into sealing engagement with the machined surface of said annular retaining ring, and a plurality of electric power transmitting brushes each having an exposed surface for engaging the exposed surface of its respective ring means secured to said second annular housing means.

9. The structure of claim 8 further characterized in that said second conduit means is provided with an annular recess in which an annular portion of said first conduit means is adapted to be seated and said channels are deeper than said electrical contact rings are thick; whereby said synthetic resinous ring assures alignment of said electric power transmitting brushes with said electrical contact rings.

References Cited by the Examiner
UNITED STATES PATENTS

| | | |
|---|---|---|
| 2,433,938 | 1/48 | Varner. |
| 2,794,560 | 6/57 | Buschbom _____ 214—17.84 |
| 2,801,137 | 7/57 | Clay. |
| 3,079,016 | 2/63 | Dretzke _____ 214—17.84 |

HUGO O. SCHULZ, *Primary Examiner.*